Patented Apr. 21, 1953

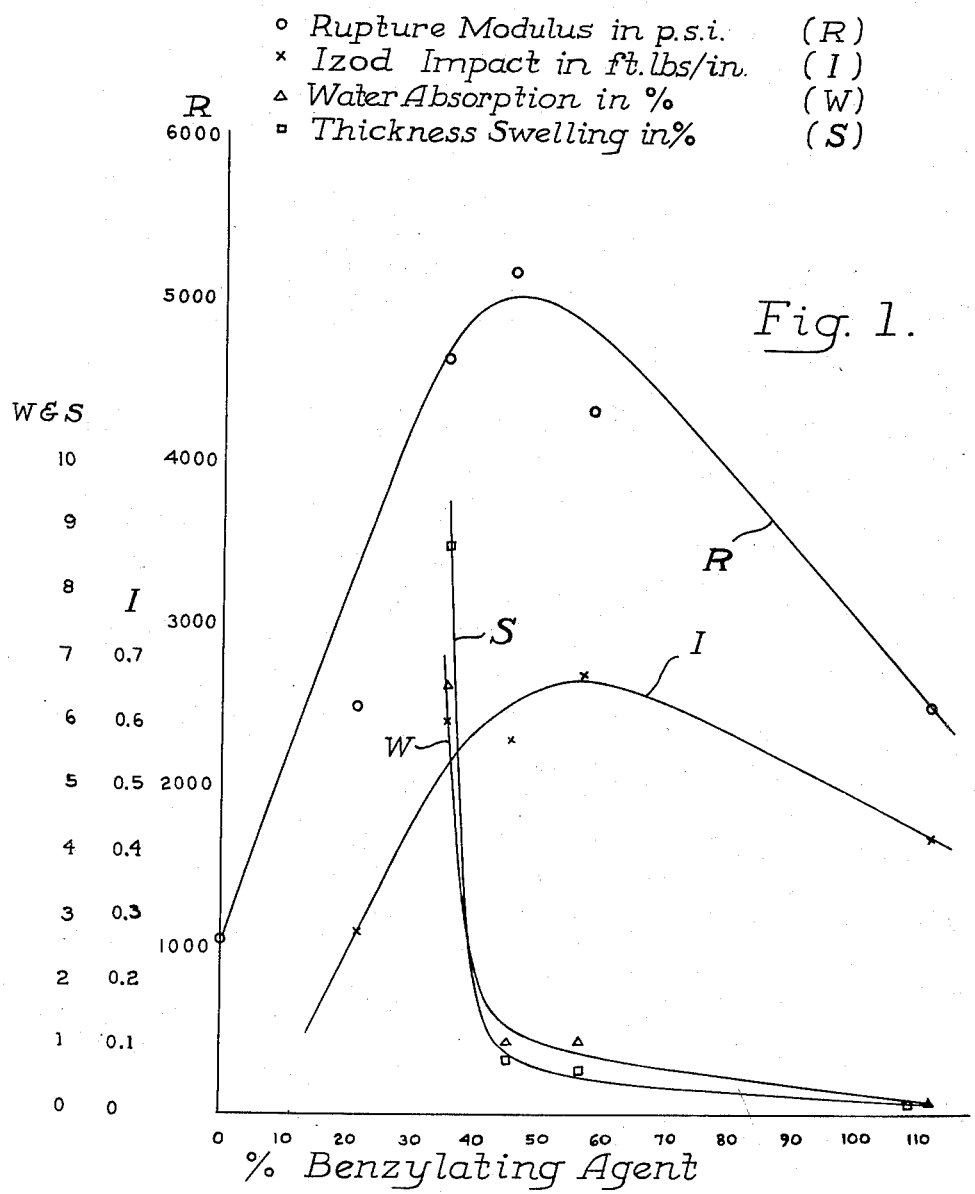

2,635,968

UNITED STATES PATENT OFFICE 2,635,968

ETHERIFIED LIGNOCELLULOSE, ETHERIFIED LIGNOCELLULOSE CONTAINING PRODUCTS, AND METHOD OF MAKING THE SAME

Earl G. Hallonquist, Tacoma, Wash., assignor to Plywood Research Foundation, Tacoma, Wash., a nonprofit corporation of Washington Application June 15, 1948, Serial No. 33,138

26 Claims. (Cl. 106—200)

1

The present invention relates to etherified lignocellulose compositions; to a process of making etherified lignocellulose compositions; to molded products containing etherified lignocellulose compositions; and to a method of making molded products containing etherified lignocellulose compositions. The invention pertains particularly to a benzylated wood product and to a pressed synthetic board made therefrom.

As is well known, lignocellulose material comprises broadly lignin, hemicellulose and cellulose. Each of these three constituents contains hydroxyl groups which may be converted to ether groups by reaction with etherifying reagents. Thus, by reacting lignocellulose material with an appropriate etherifying reagent, it is possible to prepare lignocellulose compositions wherein the available hydroxyl groups have been etherified in varying degree, the degree of etherification being determined by such factors as the ratio of the etherifying reagent to the lignocellulose material, the intensity and duration of the treatment, etc.

It is present commercial practice to prepare a relatively exhaustively etherified product by reacting cellulose with a large excess of etherifying agent under reaction conditions which replace substantially two-thirds of the available hydroxyl groups with ether groups. In the manufacture of benzyl cellulose, for example, cellulose is reacted with from 300% to 700% of its weight of benzyl chloride at temperatures approximating 90° C. to 100° C. for a time period of from eight to twenty-four hours. The product then is subjected to a complicated washing procedure in order to purify it. In a typical instance, it is kneaded four times with water and thirteen times with 90% methanol. It is then washed fifteen times (one-half hour each) with methanol in the presence of salt, filtered, and washed five times with cold water and ten times with hot water. It is then dried, washed ten times with hot water, cooled, centrifuged, ground and dried. The product of this complicated and expensive procedure is a completely thermoplastic powder which is useful as a molding composition.

I have discovered that by controlling the degree of etherification of lignocellulose material within limits as specified herein, the course of the reaction leading to the formation of ether derivatives of cellulose, hemicellulose and lignin is affected surprisingly and profoundly. The time required to effect the reaction is reduced from the eight to twenty-four hours previously required to less than about fifteen minutes. The compli-

2 cated washing procedure of the prior art process is simplified so that but three to four rapidly effectuated washings with water are needed. In addition, there is formed as a product an etherified lignocellulose the properties of which have been improved to a surprising and unexpected degree and which is valuable for use in the fabrication of molded products, particularly synthetic boards, having superior water resistance and other properties.

The manner in which the foregoing and other advantages of the present invention are obtained will be apparent from the following specification and claims considered together with the single figure of the drawing, wherein are presented graphs showing the water absorption, swelling, and strength properties of composite board made from benzylated lignocellulose prepared in accordance with the process of the present invention. Specifically presented are graphs showing:

(a) The relationship between the amount of benzylating agent used in the preparation of benzylated wood, expressed as per cent by weight of the wood treated, and the moduli of rupture of composite products made therefrom, expressed in pounds per square inch;

(b) The relationship between the amount of benzylating agent and the Izod impact resistance (notched, flatwise) of the composite products, expressed in foot pounds per inch;

(c) The relationship between the amount of benzylating agent and the water absorption characteristics of the composite products, measured by soaking weighed hard board samples in water at 75° F. for twenty-four hours and expressed as the per cent increase in weight of the soaked samples over their original weight; and (d) The relationship between the amount of benzylating agent and the swelling characteristics of the composite products, determined by soaking measured samples of hard board in water for twenty-four hours at 75° F. and measuring the increase in thickness of the soaked samples, the same being expressed in terms of per cent of the original thickness.

The process of the present invention is applicable to a wide variety of lignocellulose materials. It is applicable for example to such annual products as straw, sugar cane, corn stalks and the like. It is particularly applicable, however, to the wood of trees, and will further be described with particular reference to this material as being illustrative of lignocellulose materials broadly. The wood may be derived from trees of various species, either hard wood or soft wood. It is preferably in the form of small pieces such as wood fiber, sawdust, or wood flour (through 20 mesh or finer). Through 20 mesh wood flour derived from the wood of the Douglas fir is of particular interest in connection with the herein described process because of its adaptability to the same as well as because of its low cost and availability as a byproduct of the lumber industry. These are preferably used in the raw state, i. e., without any preliminary chemical treatment such as hydrolysis, and with substantially their original contents of cellulose, hemicellulose and lignin.

To form the etherified lignocellulose compositions of the invention, the foregoing and other lignocellulose materials may be reacted with etherifying reagents under conditions of time, temperature, pressure and pH such as will result in the replacement with ether groups of the hydroxyl groups present on the cellulose, hemicellulose and lignin to the desired extent. Etherifying reagents which may be used for this purpose include particularly the aralkyl halides, such as benzyl chloride or benzyl bromide. They include, however, the saturated and unsaturated alkyl halides, such as methyl chloride, ethyl chloride, ethyl bromide, ethyl iodide, allyl chloride, methallyl chloride, methallyl bromide, and the like. There also may be used certain of the halogenated ethers such as dichloro ethyl ether and also the alkyl sulfates, including dimethyl sulfate, diethyl sulfate, etc.

As indicated above, it is a primary teaching of the present invention that the etherifying reagents are used in amounts substantially less than are required to etherify relatively exhaustively the lignocellulose material with which they are reacted. It is necessary to react cellulose materials with from 300% to 700% their weight of an etherifying reagent in order to replace about two-thirds of the available hydroxyl groups with ether groups. In accordance with the presently described process, however, an amount of etherifying agent is employed which is less than about 100%, preferably between about 20% and about 70% of the weight of lignocellulose material.

It is to be noted in this connection that because of the complex character of lignocellulose materials, because of the lack of knowledge concerning the chemical constitution of certain of their components, because of lack of knowledge as to which of the several types of hydroxyl groups present in the cellulose, hemicellulose and lignin will react first with the etherifying reagent, and because of inability to determine accurately by analysis the degree of etherification, it is impossible to set forth exactly the composition of the mixture resulting when lignocellulose material is reacted with an etherifying reagent. This problem is complicated further by the fact that, during the etherifying reaction, which involves the use of aqueous solutions of alkali, certain of the constituents of the lignocellulose material are converted in varying degree to water soluble products. These are, of course, lost during the washing procedure. As a result, we have adopted the practice of correlating the degree of etherification with the ratio of the amount of etherifying agent used to the amount of lignocellulose material reacted with the same. Hence the expression "100% etherified lignocellulose" denotes lignocellulose which has been reacted with 100% of its own weight of an etherifying reagent. Correspondingly the phase "50% benzylated wood" denotes wood which has been reacted with 50% of its weight of an etherifying agent, even though different etherifying agents have different weights and benzylating effects. This system of terminology is adopted herein and is used throughout the drawing, specification, and claims.

Broadly stated, the procedure employed in effectuating the process of the present invention comprises admixing lignocellulose material with an aqueous solution of a base and with the particular etherifying reagent to be employed, and subjecting the resulting mixture to elevated temperatures, and in some instances elevated pressures, for a time sufficient to react the etherifying reagent substantially completely with the lignocellulose material. The reaction mixture then is diluted with water, acidified, and the solid reaction product removed from the aqueous medium and washed with water, and dried.

Bases which may be employed together with the etherifying reagent include preferably the basic acting compounds of the alkali metals particularly sodium hydroxide or potassium hydroxide. There also may be employed, however, other basic materials including ammonium hydroxide, the substituted ammonium hydroxides such as tetramethyl ammonium hydroxide, and various organic bases such as ethanolamine, triethylamine, pyridine, quinoline, etc. These may be used singly or in admixture with each other. Because of its economy and effective action, it is preferred to use ordinary sodium hydroxide (caustic soda).

The base preferably is employed in an amount which is roughly equivalent to the amount of etherifying agent used. Preferably, also, it is added in the form of a concentrated aqueous solution or suspension, for example, one containing from about 40% to about 60% by weight of base.

In effecting the etherification reaction the foregoing materials may be introduced into a suitable reaction vessel which preferably is equipped with stirring or other means for agitating the contents thereof. It may be designed for use at atmospheric or superatmospheric pressures, depending principally upon the identity of the particular etherifying agent employed.

As indicated above, the etherifying reaction preferably is carried out at elevated temperatures, these being temperatures which approximate the boiling temperature of the aqueous reaction medium. In general, the reaction temperature may vary between about 90° C. and about 150° C. It is preferred as soon as the reacting materials have been mixed together to elevate the temperature rapidly to the desired level and to maintain it there for the duration of the reaction period.

Although with most etherifying reagents the reaction whereby the lignocellulose material is converted to its ether derivatives may be carried out at atmospheric pressures, it may in some instances be desirable to use superatmospheric pressures. This is true, for example, where the etherifying reagent is volatile and may escape from the mixture before the reaction is complete. In such cases, reaction pressures of the order of between about 60 and about 120 pounds per square inch usually will be suitable.

The reaction is carried on under the conditions outlined above until substantially all of the etherifying reagent has reacted with the lignocellulose material. This will require time periods of less than about 120 minutes, usually from about 15 minutes to about 45 minutes. However, the reaction is rapid and good results have been obtained in reaction periods of as little as 5 minutes. It is of interest to note that progress of the reaction may be followed by a color change occurring in the lignocellulose material, which gradually is converted from a light tan material to a product which is slightly yellowish-orange in color.

The etherified product retains its original granular or fibrous form and therefore readily is washed to free it from the reagents used in its preparation. This procedure may be carried out by first diluting the reaction mixture with a substantial volume of water, neutralizing the excess base which may be present with a dilute mineral or organic acid such as dilute sulphuric acid, and then filtering the diluted mixture to separate the etherified lignocellulose material as a solid product. The latter then may be washed rapidly and successively with from 2 to 5 portions of water and dried.

The etherified lignocellulose material obtained as a product of the process of the invention is obtained in the form of particles which usually are light yellowish-orange in color and have substantially the form and shape of the particles comprising the starting material. It has no tendency to become gelatinous, as do the exhaustively etherified lignocellulose products. It is considerably more hydrophobic than the original lignocellulose starting material, a fact which is of the greatest significance in determining its applicability to the manufacture of synthetic board products. Although it is not completely thermoplastic as are the exhaustively etherified lignocellulose products, it is softened to a certain extent by the application of heat so that upon the contemporaneous application of pressure the individual particles are bound together. Hence, it may be molded into useful products by placing it in a press and applying pressures of the order of 1,000 to 3,000 pounds per square inch at temperatures of from about 100° C. to about 300° C. for times of from about 2 to about 30 minutes. It is particularly useful, however, in the production of molded products when in admixture with various thermoplastic or thermosetting materials as is disclosed more fully hereinafter.

The following examples illustrate the etherified lignocellulose compositions of the invention and the process for their production. In each of the examples, etherified lignocellulose material was prepared and formed into composite products by molding at 2,000 pounds per square inch and 160° C. for 10 minutes. The resulting products were evaluated by subjecting them to standard tests designed to measure their strength and water resistance characteristics. The strength values were determined by the standard procedure for measuring the modulus of rupture in pounds per square inch, as well as by the standard Izod notched impact resistance test, both edgewise (E) and flatwise (F), these values being expressed in pounds per inch. The water resistance of the products was measured by determining the water absorption and thickness swelling occurring when samples were soaked in water at 75° F. for twenty-four hours, the weights and dimensions of the soaked samples being compared with their original weights and dimensions. The water absorption then was calculated as the increase in weight, expressed as per cent of the original weight, and the thickness swelling as the increase in thickness, expressed as per cent of the original thickness.

In all of the examples, the relative amounts of the materials are expressed in part by weight.

Example 1

This example illustrates the use of ethyl chloride as an etherifying agent.

50 parts of Douglas fir sawdust having a particle size of 20 to 40 mesh and a moisture content of 12.7% by weight was admixed with 50 parts of 50% by weight aqueous sodium hydroxide solution in a pressure reaction vessel. The resulting mixture was cooled to 5° C. and 25 parts of ethyl chloride cooled to 0° C. was added. The vessel then was sealed and heated to 110° C. This temperature was maintained for 30 minutes, during which time the maximum pressure developed was 195 pounds per square inch. The vessel then was cooled, opened and the reaction mixture diluted with about 1000 parts of water. It was then acidified and washed 3 times with 1000 parts of water and dried. The product was light yellow in color and, upon being molded at 160° C. and 2000 pounds per square inch pressure, it had the following properties:

| | |
|---|---|
| Modulus of rupture (p. s i.) | 5,300 |
| Impact resistance, Izod, notched edgewise (ft. lbs./in.) | 0.460 |
| Impact resistance, Izod, notched flatwise (ft. lbs./in.) | 0.514 |
| Water absorption (per cent by wt.) | 7.1 |
| Thickness swelling (per cent) | 6.0 |

Example 2

This example illustrates the use of allyl chloride as an etherifying reagent.

50 parts of Douglas fir sawdust having a particle size of 40 to 100 mesh and containing 8.0% by weight moisture was admixed in an autoclave with 100 parts of a 50% by weight aqueous solution of sodium hydroxide. After cooling the mixture to 20° to 25° C., 50 parts of allyl chloride was added. The autoclave then was sealed and heated to 110° C. for 1½ hours, during which time a maximum pressure of about 80 pounds per square inch was developed. It was then cooled, its contents diluted with about 1000 parts of water, and neutralized with dilute sulphuric acid. The product then was washed 3 times with 1000 parts of hot water, and the washed product dried. The etherified reaction product, which was light yellow in color, was obtained in a yield of 122.5% by weight, based on the weight of the sawdust used. On being molded at 160° C. and 2000 p.s.i. pressure, it had the following properties:

| | |
|---|---|
| Modulus of rupture (p.s.i.) | 2,810 |
| Impact resistance, Izod, notched edgewise (ft. lbs./in.) | 0.196 |
| Impact resistance, Izod, notched flatwise (ft. lbs./in.) | 0.233 |
| Water absorption (per cent by weight) | 1.8 |
| Thickness swelling (per cent) | 0.4 |

Example 3

The following example illustrates the use of dimethyl sulphate as an etherifying agent.

A quantity of lignocellulose material, e.g. Douglas fir sawdust having a particle size of 20 to 40 mesh and a moisture content of about 12.0% may be placed in a suitable reaction vessel and mixed with a substantially equivalent (by weight) proportion of 50% aqueous sodium hydroxide solution. The temperature of the resulting mixture then may be raised to about 65° C. and an amount of dimethyl sulfate equal to about 50% of the weight of the lignocellulose material may be added gradually and with stirring. The basic reaction mixture containing dimethyl sulfate and lignocellulose materials may be stirred at about this temperature for a period of about one hour at ordinary atmospheric pressure. At the end of this time the methylated lignocellulose material may be removed from the reaction vessel, washed with water, and dried.

Example 4

The following examples illustrate the use of benzyl chloride as an etherifying agent.

150 parts of Douglas fir sawdust having a particle size of 20 to 40 mesh and containing 12.0% by weight moisture was thoroughly mixed with 45 parts of a 50% by weight aqueous sodium hydroxide solution. 22.5 parts benzyl chloride then was added with further mixing. The resultant mixture was heated rapidly to 110° C. and maintained at this temperature for 30 minutes. The sawdust turned a slightly yellowish color as the reaction proceeded. At the end of the reaction period, 3 litres of cold water was added, the excess alkali neutralized with dilute sulfuric acid to a pH of 3.0 and the product filtered and washed with three successive 3-liter portions of water. It was then dried, a yield of 99.0% by weight (of the original sawdust) of dried product being obtained.

The product of the foregoing reaction is illustrative of lignocellulose materials having a low degree of benzylation which may be used in conjunction with a small amount of thermosetting or thermoplastic resin to provide molding compositions in the manner fully disclosed hereinafter (see Table III).

Example 5

To 50 parts of Douglas fir sawdust having a mesh size of 40 to 100 and a moisture content of 8.0% by weight was added 50 parts of 50% by weight aqueous sodium hydroxide. After thorough mixing, 25 parts of benzyl chloride was added with further agitation, and the resulting mixture heated to 130° C. for 15 minutes. The product was worked up as set forth in Example 4, whereupon a yield of benzylated wood of 105.4% by weight (of the original sawdust) was obtained. On molding at 160° C. and 2000 p.s.i. the product had the following properties:

Modulus of rupture (p.s.i.) _____ 4,970
Impact resistance, Izod, notched,
    edgewise (ft. lbs./in.) _____ 0.353
Impact resistance, Izod, notched,
    flatwise (ft. lbs./in.) _____ 0.479
Water absorption (per cent by wt.) _____ 1.4
Thickness swelling (per cent) _____ 0.6

A series of benzylated wood products was prepared using the general procedures outlined in Example 5 above, but varying the relative proportions of benzyl chloride and sawdust. The results, which were used in plotting the graph of the figure, are summarized in the following table:

TABLE I

| Example Number | Reaction Materials (Wt. Percent on dry Sawdust) | | | Temp. (° C.) | Time (hrs.) | Yield (Wt. Percent) | Rupture Modulus (p. s. i.) | Izod Impact (F) (lbs./in.²) | Water Absorption (Wt. Percent) | Thickness Swelling (Percent) |
|---|---|---|---|---|---|---|---|---|---|---|
| | NaOH | H₂O | C₆H₅CH₂Cl | | | | | | | |
| 6 | 112 | 112 | 112 | 110 | 1½ | 122 | 2,780 | 0.442 | 0.2 | 0.2 |
| 7 | 57 | 57 | 57 | 110 | ½ | 118 | 4,370 | 0.692 | 1.2 | 0.7 |
| 8 | 45 | 45 | 45 | 110 | 1½ | 111 | 5,220 | 0.588 | 1.1 | 0.9 |
| 9 | 45 | 45 | 35 | 110 | 1½ | 95.5 | 4,660 | 0.605 | 6.6 | 8.9 |
| 10 | 21 | 21 | 21 | 110 | ½ | 94.5 | 2,560 | 0.285 | (¹) | |
| 11 | 58 | 58 | 0 | 110 | 1½ | 75.3 | 1,100 | 0.336 | (¹) | |
| Exhaustively (about ⅔) Benzylated Cellulose | | | | | | | 3,180 | 0.262 | 0 | 0 |

¹ Disintegrated.

As is apparent from the data of Table I and from the figure, controlling the degree of benzylation effectively controls the properties of the benzylated products. Surprisingly, the strength and water resistance characteristics of the latter are fully developed by a relatively low degree of benzylation, a fact which heretofore has been entirely unrecognized. Desirable qualities of strength and water resistance are developed fully in the case of benzylated wood at benzylation levels of up to about 100% i. e. with benzylated wood in the preparation of which up to 100% by weight of benzylating agent has been used, based on the weight of the wood treated. In fact, these desirable qualities have been developed most fully within the relatively narrow range of from about 20% to about 70% benzylation. Thus, as will be noted from the rupture modulus curve of the figure, the rupture modulus of molded products made from benzylated wood reaches a relatively sharp maximum at about 45% benzylation. The Izod impact resistance reaches a well defined maximum at about 55% benzylation. Increasing the degree of benzylation beyond about 45% has but little effect in increasing the water resistance of the products, since both the water absorption and thickness swelling approach minimum values at this benzylation level.

The etherified lignocellulose compositions of the invention have the further valuable property of being compatible with a wide variety of thermoplastic and thermosetting resinous materials. As a result, there may be prepared molding compositions comprising predominantly benzylated wood together with a relatively minor proportion of resin. This is of interest in connection with the production of molded articles, particularly synthetic materials of construction such as panel board and hard board. It is common practice to manufacture these products from finely divided wood using a suitable resin, e. g. a phenol-aldehyde resin to help bind the fibers or particles together. Such resins are relatively expensive, however, a factor which tends to limit their use.

It is a primary teaching of the present invention that in the manufacture of such products, the amount of the expensive resin binder may be reduced by the use of the hereindescribed relatively inexpensive, partially etherified lignocellulose. Such reduction is advantageous since it reduces the cost of the final product and since it enables use in consolidated products of resinous binders which of themselves have low water resistance and, therefore, are not applicable per se to this use.

The etherified lignocellulose compositions which may thus be employed in conjunction with a thermosetting or thermoplastic resin in the production of hard board and other consolidated products comprise a lignocellulose material which has been reacted with an etherifying agent in the manner described hereinabove. The degree of etherification is relatively low, it being necessary to use only up to about 100%, preferably between about 5% and about 25% by weight of etherifying agent, based upon the weight of lignocellulose material treated therewith. To reduce further the cost of the composition, a substantial proportion, i. e. from about 5% to about 75% by weight of wood fiber, wood flour or other raw lignocellulose material may be used in conjunction with the etherified products.

A wide variety of thermosetting resins may be used together with the etherified lignocellulose material. Such resins include, for example, the phenol-aldehyde resins, the same being the water-miscible condensation products of a phenol and an aldehyde such as, for example, the condensation products of phenol and formaldehyde, phenol and furfural, phenol and the substituted furfurals, the cresols and formaldehyde, the xylenols and formaldehyde, resorcinol and formaldehyde and the like. A typical phenol-aldehyde resin which is suitable for use in the hereindescribed compositions is the product manufactured and sold by Reichhold Chemicals, Inc., under the trade name of "Plyophen 5015," the same being an aqueous suspension of phenol formaldehyde resin containing from 68 to 70% by weight solids. An example of a suitable thermoplastic resin for use in the compositions of the invention is the product manufactured by the Neville Co. under the trade name of "Paradene No. 2" which is a coumarone-indene type resin derived largely from by-products of the coking industry. It is a solid having a color range of from 12–16 and a melting point of from 100°–125° C.

Other thermosetting resins which may be employed are the urea formaldehyde resins, the melamine formaldehyde resins, and the like.

Likewise, there may be used a wide variety of thermoplastic resins in conjunction with the etherified lignocellulose compositions of the invention. Illustrative of such thermoplastic resins are the vinyl resins including polyvinyl acetate, polyvinyl chloride, polyvinyl chloroacetate and polyvinyl butyral; the polystyrene resins; the alkyd resins; the polyamide resins; the coumarone type resins including the coumarone resins themselves, the coumarone-indene resins, and the coumarone-indene-phenolic resins; the rosin type resins including rosin itself, the esters of rosin such as the glycerol ester, and hydrogenated rosin; and certain of the natural gums. Of particular interest is the product manufactured and sold by the Hercules Powder Co. under the trade name of "Vinsol," the same being a rosin fraction which is insoluble in petroleum solvents. It has properties as follows: melting point (Hercules drop method) 114° C.; acid number 90; and saponification number 140.

The relative proportions of etherified lignocellulose materials, resin binder, and raw lignocellulose material such as wood flour are somewhat variable depending upon the extent of etherification of the lignocellulose material, the nature of the resin binder, and the amount of raw lignocellulose material employed. However, illustrative proportions are given in Table II below, benzylated wood being used as an example of an etherified lignocellulose material.

TABLE II

|  | Parts by weight |
|---|---|
| Benzylated wood | 20–98 |
| Resin binder | 30– 2 |
| Raw wood | 50– 0 |

The various constituents of the molding or board making compositions are compounded by admixing them thoroughly in mixers of conventional design adapted for either batch or continuous operation. It is preferred first to place the etherified lignocellulose material and the wood flour, if the latter is used, in the mixer; next to initiate the movement of the same, and then to add the resinous binder (powder or liquid) gradually and with continued agitation. After the addition of the resinous binder has been completed, the agitation is continued for a time sufficient to secure thorough dispersion of the binder throughout the mass. If in a particular instance the liquid resinous binder is too viscous to obtain the desired degree of mixing within a reasonable time, water as necessary may be added thereto to reduce the viscosity to a practical working level.

After the mixing operation is completed, the compounded mass is removed from the mixer, and may be dried either in the air or in a kiln to adjust its moisture content to a value appropriate to the particular pressing operation contemplated. In the usual case, the moisture content may be thus reduced to a value of not more than about 25% by weight.

The dried, compounded mixture then is placed in a press, e. g. in a retaining form or "chase," and pressed under conditions of time, temperature, and pressure sufficient to cure any thermosetting resin which may be present and to compress and consolidate the mass to a product of the desired density. When producing a board having a density of between about 0.6 and 1.2, pressing at between about 100° C. and about 300° C. at pressures of between about 50 pounds per square inch and about 500 pounds per square inch for a time of between about 2 minutes and 30 minutes may be required. In the usual case, it suffices to press the mixture from 10 to 20 minutes at a temperature of about 165° C. and a pressure of about 200 pounds per square inch.

The process whereby etherified lignocellulose compositions and resinous binding materials are combined to form consolidated products is illustrated by the following examples wherein benzylated wood prepared by the general method outlined above (Example 4) is employed as a typical etherified lignocellulose composition and the operation of making composite board is employed as being a typical method of making a consolidated product.

In all of the following examples, the benzylated wood, resinous binder, and wood flour, if such was used, were thoroughly mixed, using water as necessary to promote thorough mixing. The resulting mixture then was dried to a moisture content of less than about 25% by weight and pressed at 200 pounds per square inch and 165° C. for from 10 to 20 minutes. The boards thus produced were subjected to standard procedures for determining their flexural strength, water absorption and swelling characteristics, these being determined and expressed in the manner hereinabove set forth in connection with the description of the molded etherified lignocellulose material alone. The results of these tests are summarized in Table III.

TABLE III

| Example Number | Board Composition | Percent by Wt. | Sp. Gr. | Flexural Strength (p. s. i.) | Water Absorption (percent) | Thickness Swelling (percent) | Edge Swelling (percent) |
|---|---|---|---|---|---|---|---|
| 12 | Phenol Aldehyde Resin¹ / Wood Flour² | 20 / 80 | 0.79 | 2,900 | 30.0 | 5.0 | 0.4 |
| 13 | Phenol Aldehyde Resin¹ / Benzylated Wood³ | 20 / 80 | 0.99 | 4,185 | 6.1 | 1.7 | 0.4 |
| 14 | Phenol Aldehyde Resin¹ / Thermoplastic Resin⁴ / Wood Flour² | 5 / 15 / 80 | 0.77 | 1,205 | 42.0 | 17.7 | 2.0 |
| 15 | Phenol Aldehyde Resin¹ / Thermoplastic Resin⁴ / Benzylated Wood⁵ | 5 / 15 / 80 | 1.08 | 3,565 | 3.7 | 0.9 | 0.2 |
| 16 | Phenol Aldehyde Resin¹ / Thermoplastic Resin⁶ / Wood Flour² | 5 / 15 / 80 | 0.79 | ---- | 52.3 | 15.7 | 1.3 |
| 17 | Phenol Aldehyde Resin¹ / Thermoplastic Resin⁶ / Benzylated Wood³ | 5 / 15 / 80 | 1.02 | 3,795 | 6.1 | 1.4 | 0.2 |
| 18 | Thermoplastic Resin⁶ / Wood Flour² | 20 / 80 | 0.81 | 872 | 76.0 | 43.6 | 3.6 |
| 19 | Thermoplastic Resin⁶ / Benzylated Wood³ | 20 / 80 | 0.93 | 2,065 | 8.6 | 3.2 | 0.5 |

¹ Phenol formaldehyde resin; "Plyophen 5015."
² Through 20, on 80 mesh.
³ 15% benzylation.
⁴ Coumarone-indene resin; "Paradene No. 2"; the Neville Co.
⁵ 20% benzylation.
⁶ By-product of manufacture of rosin by solvent extraction; "Vinsol."

In a manner similar to the foregoing, there are prepared board-making compositions wherein the following materials are used in place of the phenol-aldehyde and "Vinsol" binders of the foregoing examples: Urea-formaldehyde resins, melamine-formaldehyde resins, vinyl acetate resins, vinyl chloride resins, polystyrene resins, alkyd resins, polyamide resins, coumarone type resins, rosin, hydrogenated rosin and rosin esters.

It will be apparent from a consideration of the foregoing data, that use of the hereindescribed etherified lignocellulose compositions together with a resinous binder in relatively small proportions markedly increases the water resistance of the pressed product and also in many instances significantly increases its flexural strength. As will be seen by a comparison of Examples 14 and 15, substitution of benzylated wood for wood flour in the compositions of those examples reduces the water absorption of boards made therefrom from 42.0% to 3.7%; reduces the thickness swelling properties thereof from 17.7% to 0.9%; and increases the flexural strength from 1205 pounds per square inch to 3565 pounds per square inch.

Furthermore, resinous binders such as "Vinsol," which per se are of little value in the manufacture of composite board products because of the low water resistance of boards in which they are contained, are rendered applicable to the production of boards having high water resistance when used with the benzylated wood products of the invention. As will be seen by comparison of Examples 18 and 19, substitution of benzylated wood for wood flour results in the formation of a board making composition which may be used to make boards for which the water absorption values have been decreased from 76% to 8.6%, the thickness swelling values have been reduced from 43.6% to 3.2%, the edge swelling values have been reduced from 3.6% to 0.5%, and the flexural strength has been increased from 872 pounds per square inch to 2,065 pounds per square inch. It is of further interest that these desirable results are accomplished through the agency of a relatively cheap material, a factor which is of obvious economic significance.

Having now described the invention in preferred embodiments, what is claimed as new and desired to protect by Letters Patent is:

1. The process of making etherified lignocellulose compositions in the production of consolidated products which comprises admixing raw lignocellulose with an aqueous solution of a base which solution contains from about 40% to about 60% by weight of base and with an etherifying agent, said etherifying agent being added in an amount not exceeding about 100% by weight based on the weight of the lignocellulose and being added in an amount substantially equal in weight to said base; subjecting the resulting mixture to elevated temperatures between about 90° C. and about 150° C.; recovering the resulting solid etherified lignocellulose from said reaction products; and combining the said etherified lignocellulose with a resinous binder therefor.

2. The process of making benzylated lignocellulose compositions in the production of consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose and being added in an amount substantially equal in weight to said base; subjecting the resulting mixture to elevated temperatures between about 90° C. and about 150° C.; recovering the resulting solid benzylated lignocellulose from said reaction products; and combining the said benzylated lignocellulose with a resinous binder therefor.

3. The process of making etherified lignocellulose compositions in the production of consolidated products which comprises admixing raw lignocellulose with an aqueous solution of a base which solution contains from about 40% to about 60% by weight of base and with an etherifying agent, said etherifying agent being added in an amount not exceeding about 25% by weight based on the weight of the lignocellulose and being added in an amount substantially equal in weight to said base; subjecting the resulting mixture to elevated temperatures between about 90° C. and about 150° C.; recovering the resulting solid etherified lignocellulose from said reaction products; and combining the said etherified lignocellulose with a resinous binder therefor.

4. The process of making etherified lignocellulose composition in the production of consolidated products which comprises admixing raw lignocellulose with an aqueous solution of a base which solution contains from about 40% to about 60% by weight of base and with an etherifying agent, said etherifying agent being added in an amount not exceeding about 100% by weight based on the weight of the lignocellulose and being added in an amount substantially equal in weight to said base; subjecting the resulting mixture to elevated temperatures between about 90° C. and about 150° C.; recovering the resulting said etherified lignocellulose from said reaction products; making a mixture of the said etherified lignocellulose and a resinous binder therefor; and consolidating the mixture by pressing it at from about 50 to about 500 pounds per square inch and at from about 100° C. to about 300° C. for from about 2 minutes to about 30 minutes.

5. The process of making consolidated products which comprises admixing raw lignocellulose with an aqueous solution of a base which solution contains from about 40% to about 60% by weight of base and with an etherifying agent, said etherifying agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid etherified lignocellulose from said reaction products; making a mixture of the said etherified lignocellulose, a resinous binder therefor and raw lignocellulose; and consolidating the mixture by pressing it at from about 50 to 500 pounds per square inch and at from about 100° C. to about 300° C. for about 2 minutes to about 30 minutes.

6. The process of making consolidated products which comprises admixing raw lignocellulose with an aqueous solution of a base which solution contains from about 40% to about 60% by weight of base and with an etherifying agent, said etherifying agent being added in an amount not exceeding about 25% by weight based on the weight of the lignocellulose, and being added in an amount substantially equal in weight to said base; subjecting the resulting mixture to elevated temperatures between about 90° C. and about 150° C.; recovering the resulting solid etherified lignocellulose from said reaction products; making a mixture of the said etherified lignocellulose and a resinous binder therefor; and consolidating the mixture by the application of heat and pressure.

7. The process of making consolidated products which comprises admixing raw lignocellulose with an aqueous solution of a base which solution contains from about 40% to about 60% by weight of base and with an etherifying agent, said etherifying agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid etherified lignocellulose from said reaction products; making a mixture of the said etherified lignocellulose and a thermosetting resin; and consolidating the mixture by the application of heat and pressure.

8. The process of making consolidated products which comprises admixing raw lignocellulose with an aqueous solution of a base which solution contains from about 40% to about 60% by weight of base and with an etherifying agent, said etherifying agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid etherified lignocellulose from said reaction products; making a mixture of the said etherified lignocellulose and a thermosetting condensation product of a phenol and an aldehyde; and consolidating the mixture by the application of heat and pressure.

9. The process of making consolidated products which comprises admixing raw lignocellulose with an aqueous solution of a base which solution contains from about 40% to about 60% by weight of base and with an etherifying agent, said etherifying agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid etherified lignocellulose from said reaction products; making a mixture of the said etherified lignocellulose and a thermoplastic resin; and consolidating the mixture by the application of heat and pressure.

10. The process of making consolidated products which comprises admixing raw lignocellulose with an aqueous solution of a base which solution contains from about 40% to about 60% by weight of a base and with an etherifying agent, said etherifying agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid etherified lignocellulose from said reaction products; making a mixture of the said etherified lignocellulose and a thermoplastic solvent-extracted rosin binder; and consolidating the mixture by the application of heat and pressure.

11. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a resinous binder therefor; and consolidating the mixture by the application of heat and pressure.

12. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a resinous binder therefor and raw lignocellulose; and consolidating the mixture by the application of heat and pressure.

13. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of from about 70 parts to about 98 parts of the said benzylated lignocellulose and from about 30 parts to about 2 parts of resinous binder, the amount of binder being in inverse proportion to the amount of benzylated lignocellulose; and consolidating the mixture by the application of heat and pressure.

14. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a resinous binder therefor and raw lignocellulose, the amounts of the constituents being expressed in parts by weight: benzylated lignocellulose 20 to 98, binder 30 to 2, raw lignocellulose 50 to 0; and consolidating the mixture by the application of heat and pressure.

15. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a thermosetting resin; and consolidating the mixture by the application of heat and pressure.

16. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a thermosetting condensation product of a phenol and an aldehyde; and consolidating the mixture by the application of heat and pressure.

17. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a thermoplastic resinous material; and consolidating the mixture by the application of heat and pressure.

18. The process of making consolidated products which comprises admixing raw lignocellulose with an aqueous solution of a base which solution contains from about 40% to about 60% by weight of base and with a benzylating agent, said benzylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid benzylated lignocellulose from said reaction products; making a mixture of the said benzylated lignocellulose and a phenolaldehyde condensation product as a resinous binder; and consolidating the mixture by pressing it at from about 50 to 500 pounds per square inch and from about 100° C. to 300° C. for from about 2 to 30 minutes.

19. The process of making consolidated products which comprises admixing raw lignocellulose with an aqueous solution of a base which solution contains from about 40% to about 60% by weight of base and with an ethylating agent, said ethylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid ethylated lignocellulose from said reaction products; making a mixture of the said ethylated lignocellulose and a resinous binder therefor; and consolidating the mixture by the application of heat and pressure.

20. The process of making consolidated products which comprises admixing raw lignocellulose with an aqueous solution of a base which solution contains from about 40% to about 60% by weight of base and with an allylating agent, said allylating agent being added in an amount not exceeding about 100% by weight based on the weight of the lignocellulose, and being added in an amount substantially equal in weight to said base; subjecting the resulting mixture to elevated temperatures between about 90° C. and about 150° C.; recovering the resulting solid allylated lignocellulose from said reaction products; making a mixture of the said allylated lignocellulose and a resinous binder therefor; and consolidating the mixture by the application of heat and pressure.

21. As a new article of manufacture, the consolidated product comprising a mixture having been consolidated by the application of heat and pressure, said mixture comprising a resinous binder and solid etherified lignocellulose, said etherified lignocellulose having been recovered from the reaction products of raw lignocellulose admixed with an aqueous solution of a base containing from about 40% to about 60% by weight of base and with an etherifying agent, said etherifying agent having been added in an amount not exceeding about 100% by weight based on the weight of the lignocellulose, and being added in an amount substantially equal in weight to said base, and the resulting mixture having been subjected to elevated temperatures between about 90° C. and about 150° C.

22. As a new article of manufacture, the consolidated product comprising a mixture having been consolidated by the application of heat and pressure, said mixture comprising a resinous binder and solid benzylated lignocellulose, said benzylated lignocellulose having been recovered from the reaction products of raw lignocellulose admixed with an aqueous solution of a base containing from about 40% to about 60% by weight of base and with a benzylating agent, said benzylating agent having been added in an amount not exceeding about 100% by weight based on the weight of the lignocellulose, and being added in an amount substantially equal in weight to said base, and the resulting mixture having been subjected to elevated temperatures between about 90° C. and about 150° C.

23. As a new article of manufacture, the consolidated product comprising a mixture having been consolidated by the application of heat and pressure, said mixture comprising a resinous binder and solid benzylated lignocellulose, said benzylated lignocellulose having been recovered from the reaction products of raw lignocellulose admixed with an aqueous solution of a base containing from about 40% to about 60% by weight of base and with a benzylating agent, said benzylating agent having been added in an amount not exceeding about 25% by weight based on the weight of the lignocellulose, and being added in an amount substantially equal in weight to said base, and the resulting mixture having been subjected to elevated temperatures between about 90° C. and about 150° C.

24. As a new article of manufacture, the consolidated product comprising a mixture having been consolidated by subjecting it to a pressure of between about 50 pounds per square inch and about 500 pounds per square inch and at a temperature of from about 100° C. to about 300° C. for a time of from about 2 minutes to about 30 minutes, said mixture having been recovered from the reaction products of a thermosetting resinous condensation product of a phenol and an aldehyde and solid benzylated wood in the form of small pieces, said benzylated wood comprising raw wood admixed with an aqueous solution of a base containing from about 40% to about 60% by weight of base and with a benzylating agent, said benzylating agent having been added in an amount not exceeding about 25% by weight based on the weight of the wood, and being added in an amount substantially equal in weight to said base, and the resulting mixture having been subjected to elevated temperatures between about 90° C. and about 150° C.

25. As a new article of manufacture, the consolidated product comprising a mixture having been consolidated by the application of heat and pressure, said mixture having been recovered from the reaction products of a thermoplastic solvent-extracted rosin binder and solid etherified lignocellulose, said etherified lignocellulose comprising raw lignocellulose admixed with an aqueous solution of a base containing from about 40% to about 60% by weight of base and with an etherifying agent, said etherifying agent having been added in an amount not exceeding about 100% by weight based on the weight of the lignocellulose, and being added in an amount substantially equal in weight to said base, and the resulting mixture having been subjected to elevated temperatures between 90° C. and about 150° C.

26. As a new article of manufacture, the consolidated product comprising a mixture having been consolidated by the application of heat and pressure, said mixture comprising a thermosetting condensation product of a phenol and an aldehyde as a binder present from about 30 parts to about 2 parts by weight and solid benzylated lignocellulose present from about 70 parts to 98 parts by weight, said benzylated lignocellulose having been recovered from the reaction products of raw lignocellulose admixed with an aqueous solution of a base containing from about 40% to about 60% by weight of base and with a benzylating agent, said benzylating agent having been added in an amount not exceeding about 100% by weight based on the weight of the lignocellulose, and being added in an amount substantially equal in weight to said base; and the resulting mixture having been subjected to elevated temperatures between about 90° C. and about 150° C.

EARL G. HALLONQUIST.

References Cited in the file of this patent

UNITED STATES PATENTS

| Number | Name | Date |
|---|---|---|
| 833,162 | Hagar | Oct. 16, 1906 |
| 1,464,310 | DeCew | Aug. 7, 1923 |
| 2,260,187 | Miller | Oct. 21, 1941 |
| 2,265,563 | Kirkpatrick | Dec. 9, 1941 |
| 2,290,861 | Campbell | July 28, 1942 |
| 2,297,709 | Kauppi et al. | Oct. 6, 1942 |
| 2,306,274 | Meiler | Dec. 22, 1942 |
| 2,310,010 | Burrell | Feb. 2, 1943 |
| 2,379,889 | Dorland et al. | July 10, 1945 |
| 2,381,205 | Caughey | Aug. 7, 1945 |
| 2,383,096 | Warth et al. | Aug. 21, 1945 |